United States Patent
Harjunen et al.

(10) Patent No.: US 8,381,546 B2
(45) Date of Patent: Feb. 26, 2013

(54) METHOD OF DEFLECTING CONVEYOR ROLLS INTENDED FOR BENDING GLASS PANELS, AND ASSEMBLY APPLYING THE METHOD

(75) Inventors: Pete Harjunen, Nokia (FI); Veijo Valtonen, Tampere (FI)

(73) Assignee: Glaston Corporation, Tampere (FI)

( * ) Notice: Subject to any disclaimer, the term of this patent is extended or adjusted under 35 U.S.C. 154(b) by 442 days.

(21) Appl. No.: 12/602,912

(22) PCT Filed: May 20, 2008

(86) PCT No.: PCT/FI2008/050284
§ 371 (c)(1),
(2), (4) Date: Jan. 5, 2010

(87) PCT Pub. No.: WO2008/148933
PCT Pub. Date: Dec. 11, 2008

(65) Prior Publication Data
US 2010/0162764 A1    Jul. 1, 2010

(30) Foreign Application Priority Data
Jun. 6, 2007    (FI) .................................... 20075419

(51) Int. Cl.
*C03B 23/023* (2006.01)
(52) U.S. Cl. ......................................................... 65/106
(58) Field of Classification Search ................. 65/106
See application file for complete search history.

(56) References Cited

U.S. PATENT DOCUMENTS

| 4,726,832 | A * | 2/1988 | Kajii et al. .................. 65/273 |
| 6,363,753 | B1 | 4/2002 | Yoshizawa et al. |
| 6,378,339 | B1 | 4/2002 | Zalesak et al. |
| 6,397,634 | B1 * | 6/2002 | Takeda et al. .................. 65/102 |
| 2004/0007020 | A1 * | 1/2004 | Kanno et al. ................. 65/29.11 |
| 2005/0274146 | A1 | 12/2005 | Schnabel, Jr. |
| 2006/0179885 | A1 | 8/2006 | Reunamaki et al. |

FOREIGN PATENT DOCUMENTS

| EP | 0 123 119 A2 | 10/1984 |
| EP | 1 006 086 A2 | 6/2000 |

(Continued)

OTHER PUBLICATIONS

International Search Report of Application No. PCT/FI2008/050284 dated Sep. 10, 2008. Written Opinion of the International Searching Authority of Application No. PCT/FI2008/050284 dated Sep. 10, 2008.

(Continued)

*Primary Examiner* — Jason L Lazorcik
*Assistant Examiner* — Erin Snelting
(74) *Attorney, Agent, or Firm* — Buchanan Ingersoll & Rooney PC

(57) ABSTRACT

The invention relates to a method of longitudinally deflecting conveyor rolls intended for bending glass panels. The method includes deflecting the conveyor rolls during a glass-panel bending process by turning link member on which the ends of the conveyor rolls are mounted with bearings. In order to turn the link members of each conveyor roll, at least one link member is subjected to a force sufficient for its turning by a position-identifying electric drive. At least the other link member is subjected to a force sufficient for its turning by a second electric drive, which is controlled on the basis of position data provided by the position-identifying electric drive. The present invention relates also to an assembly applying the method for bending glass panels.

11 Claims, 1 Drawing Sheet

| | FOREIGN PATENT DOCUMENTS | | |
|---|---|---|---|
| FI | 11576 | A | 6/1927 |
| FI | 20035022 | A | 8/2004 |
| WO | WO 98/17594 | A1 | 4/1998 |
| WO | WO 2004/074194 | A1 | 9/2004 |

OTHER PUBLICATIONS

Finnish Search Report of Application No. FI 20075419 dated Feb. 18, 2008 (with English translation of category of cited documents).

* cited by examiner

METHOD OF DEFLECTING CONVEYOR ROLLS INTENDED FOR BENDING GLASS PANELS, AND ASSEMBLY APPLYING THE METHOD

The present invention relates to a method of deflecting conveyor rolls intended for bending glass panels, said method comprising deflecting the conveyor rolls during a glass-panel bending process by turning link members on which the ends of the conveyor rolls are mounted with bearings.

In addition, the invention relates to an assembly for deflecting conveyor rolls intended for bending glass panels, said assembly comprising the conveyor rolls, link members on which the ends of the conveyor rolls are mounted with bearings, the conveyor rolls being deflectable during a glass-panel bending process by turning said link members.

Figure 2:
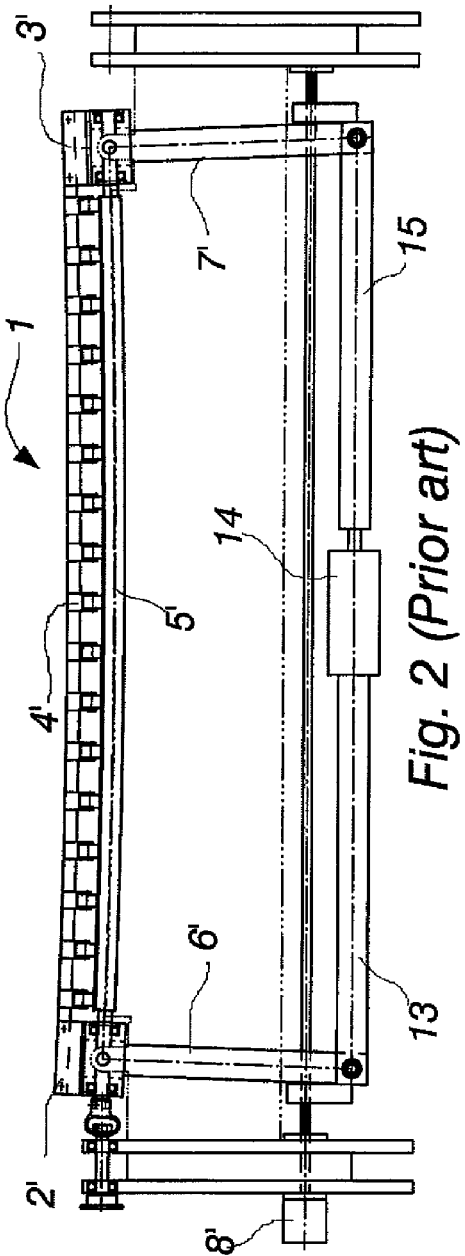

Conveyor rolls as described above are previously known for example from the Applicant's patent publication FI 11576. The deflection mechanism for such rolls is shown in the attached FIG. 2, presenting the prior art. Bending rolls 5' as shown in FIG. 2, and press rollers 4' (can also be replaced with a single long roll) disposed thereabove, are arranged in a bending station horizontally. The roll/roller sets are arranged in succession to enable conveying glass panels through the bending station between the roller assembly and the rolls. At the same time, the rolls are being deflected by means of link members 6' and 7' mounted on the ends of the rolls, whereby a glass panel, which has been heated to a sagging temperature, bends in a direction transverse to its advancing direction. The conveyor rolls are bearing-mounted at the ends thereof with link members, the turning of which enables a turning motion of the conveyor rolls. The turning action of the link members is adapted to occur by means of a push rod 13, 15, which is set below the rolls between the link members and which is associated with a motor-driven actuator 14 for changing the rod length. A change of the rod length produces a turn-effecting push force on the link members. The turning action creates a moment, which turns the rolls simultaneously at both ends, resulting in a deflected roll.

Although the foregoing assembly does enable bending a glass panel in its advancing direction and in a direction transverse to its advancing direction, the push rods claim a lot of space. Consequently, the disposition of sub-roll glass panel heating equipment, such as convection fans or radiation heaters, or else the disposition of glass-panel cooling equipment below the rolls, is quite an inconvenient procedure or at least requires special arrangements.

An object of the present invention is to eliminate or at least substantially alleviate the foregoing drawbacks of the prior art.

In order to accomplish the above object of the invention, a method according to the present invention is characterized in that, in order to turn the link members of each conveyor roll, at least one link member is subjected to a force sufficient for its turning by a position-identifying electric drive, and that at least the other link member is subjected to a force sufficient for its turning by a second electric drive, which is controlled on the basis of position data provided by the position-identifying electric drive.

In addition to the above, an assembly applying the method of the invention is characterized in that in association with at least one link member of each conveyor roll is disposed a position-identifying electric drive, which enables applying to the discussed link member a force sufficient for its turning, and that in association with the other link member is disposed a second electric drive, which enables applying to the second link member a force sufficient for its turning and which is capable of being controlled on the basis of position data provided by the position-identifying electric drive.

A notable advantage gained by a method and apparatus of the present invention is at least the fact that it enables avoiding a mechanical connection (push rod) between the link members, which connection, as pointed out above, requires a lot of space. As a result, a method and assembly according to the invention provides more space below the rolls than what is available in the prior art, enabling for example a more diversified disposition of heating or cooling equipment (blast enclosures). Heating equipment, for example, can be positioned more precisely between the lower rollers, with no mechanical push rods adversely in the way. In addition, the assembly below conveyor rolls can be accommodated in a smaller space than in the prior art.

Figure 1:
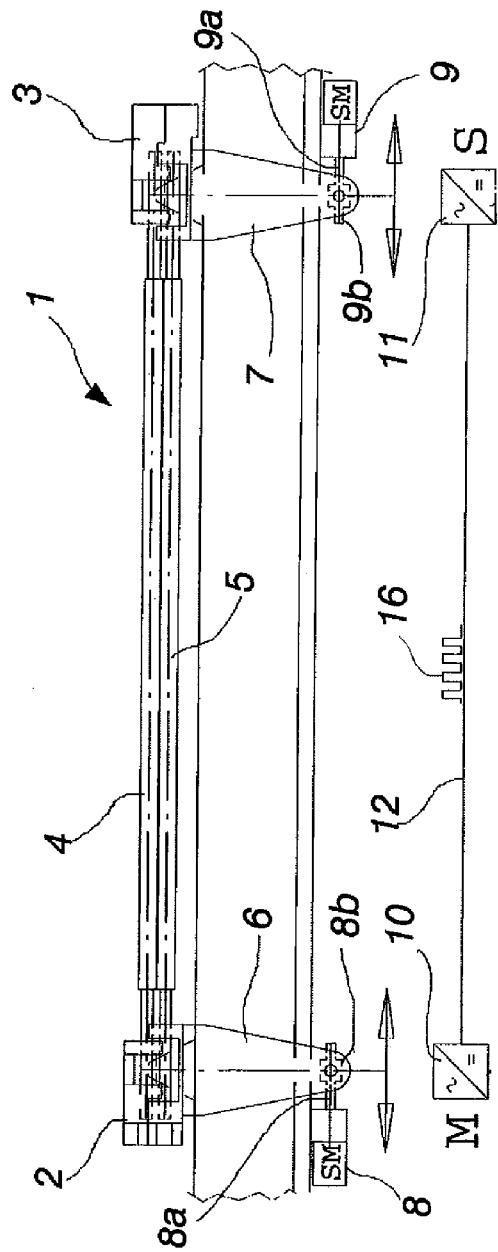

Preferred embodiments of the present invention are depicted in the accompanying drawings, in which:

FIG. 1 shows an example of an assembly applying a method of the invention, and FIG. 2 shows an assembly of the prior art.

Thus, FIG. 1 shows an example of an assembly applying a method of the invention for deflecting conveyor rolls. The conveyor rolls are designated by reference numeral 5 and their corresponding pairs of upper rolls are designated by reference numeral 4. A glass panel (not shown) is adapted to travel through between the roll sets 4 and 5. The roll sets are preferably arranged with a plurality of such sets in succession for establishing a glass-panel conveying path in such a way that the successive roll sets constitute a bender. The bender is established as part of a larger-scale glass processing apparatus as described for example in the patent publication FI 115768.

It should be pointed out that the bender enables bending a glass panel not only in a transverse bending mode but also in its advancing direction. This feature has been described in the Applicant's own patent publication FI 115768, for example in FIGS. 8 and 9. There is no need to explain this feature more closely at this time.

A first end of the roll sets 4, 5 is bearing-mounted by means of a first bearing element 2. A second end is bearing-mounted by means of a second bearing element 3. The bearing elements 2 and 3 are preferably module-type elements, which enable mounting the first end of the lower roll 4 and that of the upper roll 5 with bearings on a common element 2 and mounting the second ends thereof with bearings on a common element 3.

The bearing elements 2 and 3 of each roll set 4, 5, in other words both end regions of the conveyor rolls 4, 5, are provided with link members 6 and 7. The link member 6 (7) is preferably an elongated lever-type element extending downward or in steep downward inclination from the bearing element 2 (3). The link member 6 has its top end connected preferably in a rigid manner to the bearing element 2. The link member 7 is connected in a similar manner to the second bearing element 3. The link member 6 (respectively the link member 7) is in turn connected at its bottom end to an electric drive 8 (9).

FIG. 1 depicts an embodiment, wherein the first electric drive 8 is fixed in a stationary position. The electric drive 8 rotates or moves an elongated motion element, such as a screw element 8a, which is in engagement with the internal thread of a mating bracket 8b. The rotating screw element 8a can be naturally replaced by a rod or shank, movable in a longitudinal direction for example by the electric drive 8 and attached to the mating bracket 8a. The electric drive 8 identifies its own position and speed of movement, and thereby also the angle and speed of rotation of the screw or the displacement and speed of the shank in a longitudinal direction. Such an electric drive 8, capable of identifying its own position, can be for example a servomotor which is equipped with a pulse sensor. Such motors represent technology known as such for a person skilled in the art and, thus, a more detailed description of the motor construction is unnecessary at this time.

The first servomotor 8 is controlled by a master controller 10. The master controller 10 is preferably in communication with a control system for the overall glass processing apparatus. From the control system, individual control commands are obtained to the controller 10, from which said commands are communicated to the servomotor 8. The servomotor 8 receives from the master controller 10 an electric command to turn through a defined angle of rotation. Turning of the motor 8 rotates in turn the screw 8a or alternatively displaces the rod. Consequently, the link member 6 has its bottom part shifting for example to the left in FIG. 1, creating a moment that deflects the bearing element 2 and thereby the conveyor rolls 4 and 5. Hence, a bending or deflection of the conveyor rolls 4 and 5 at the first end thereof is proportional to the angle of rotation of the electric drive 8.

Thus, the second link member 7 is connected at its bottom end to a second electric drive 9 in a manner similar to the first link member 6. The electric drive 9 has its motion elements 9a disposed for acting on the link member in a direction preferably opposite to the motion elements of the first electric drive 8. The second electric drive 9 obtains its control from a so-called slave controller 11. In order to execute a control function, the position data of the servomotor 8 (and thus also the motion element 8a) is delivered from the pulse sensor of the first electric drive 8 along an electrical data transmission bus (not shown) to the master controller 10. In this case, the position data is thus received from the pulse sensor of the first electric drive 8. From the master controller 10, the above-mentioned position data is transmitted over an electrical data transmission bus 12 to the slave controller 11, from which the position and speed data is transmitted to the second electric drive 9. The electrical data transmission medium 12 can be for example a cable, along which an electrical pulse train 16 can be transmitted. The number of pulses in the pulse train 16 determines a position of the second electric drive 9, which is preferably the same as that of the first electric drive 8. The frequency of the pulse train 16 determines a speed of the electric drive 8, by which the position of the electric drive 8 and thereby also that of the link member changes. Hence, the cable 12 establishes a so-called electrical axis between the electric drives 8 and 9, enabling a synchronized positioning of each electric drive. With this arrangement, in which the second electric drive 9 is adapted to trace with positional synchronism the actions of the first electric drive 8, it is ensured that the link members 6 and 7 shall be rotated in a similar manner. Thus, both ends of the rolls 4 and 5 become subjected to equal rotative moments through the intermediary of the link members 6 and 7.

In practice, a mechanical shaft between the link members 6 and 7 has been replaced by a cable between the master controller 10 and the slave controller 11. The cable and control equipment are accommodated in a separate control cabinet, whereby the space claimed by a mechanical transmission can be used e.g. for heating or cooling equipment.

The present invention is not limited solely to the presented embodiment, but can be applied in a multiplicity of ways within the scope of protection defined in the appended claims.

The invention claimed is:

1. A method of longitudinally bending conveyor rolls intended for bending glass panels, said method comprising bending the conveyor rolls during a glass-panel bending process by turning a plurality of link members on which the ends of the conveyor rolls are mounted with bearings, wherein, in order to turn the link members of each conveyor roll, at least a first one of the link members is subjected to a force sufficient for its turning by a position-identifying electric drive, and at least a second one of the link members is subjected to a force sufficient for its turning by a second electric drive, which is controlled on the basis of position data provided by the position-identifying electric drive, wherein said first one of the link members is disposed on one end of each said conveyor roll and said second one of the link members is disposed on an opposing end of each such conveyor roll.

2. A method as set forth in claim 1, wherein the position-identifying electric drive is equipped with a master controller and the second electric drive with a slave controller, the position data being communicated from the master controller over a data transmission bus to the slave controller.

3. A method as set forth in claim 2 wherein, on the basis of position data, the second electric drive is actuated for subjecting the second link member to a force which is equal to that established by the position-identifying electric drive.

4. A method as set forth in claim 2, wherein the electric drives are servomotors.

5. A method as set forth in claim 2, wherein the first and second link members of the conveyor rolls are turned synchronically in directions opposite to each other.

6. A method as set forth in claim 1 wherein, on the basis of position data, the second electric drive is actuated for subjecting the second link member to a force which is equal to a force established by the position-identifying electric drive.

7. A method as set forth in claim 6, wherein the electric drives are servomotors.

8. A method as set forth in claim 6, wherein the first and second link members of the conveyor rolls are turned synchronically in directions opposite to each other.

9. A method as set forth in claim 1, wherein the electric drives are servomotors.

10. A method as set forth in claim 9, wherein the first and second link members of the conveyor rolls are turned synchronically in directions opposite to each other.

11. A method as set forth in claim 1, wherein the first and second link members of the conveyor rolls are turned synchronically in directions opposite to each other.

* * * * *